United States Patent [19]

Hollis

[11] Patent Number: 4,909,839
[45] Date of Patent: Mar. 20, 1990

[54] SECONDARY LEAD PRODUCTION

[75] Inventor: Richard G. Hollis, Mount Isa, Australia

[73] Assignee: Mount Isa Mines Limited, Queensland, Australia

[21] Appl. No.: 182,288

[22] Filed: Jan. 15, 1988

Related U.S. Application Data

[63] Continuation-in-part of Ser. No. 837,075, Mar. 6, 1986, abandoned.

[30] Foreign Application Priority Data

Mar. 7, 1985 [AU] Australia ............................. PG 9598

[51] Int. Cl.$^4$ ............................................. C22B 13/06
[52] U.S. Cl. .......................................... 75/63; 75/77; 423/87; 423/617
[58] Field of Search ............... 75/77, 69, 63; 420/572; 423/87, 617

[56] References Cited

U.S. PATENT DOCUMENTS

| | | | |
|---|---|---|---|
| 4,251,271 | 2/1981 | Floyd | 266/225 |
| 4,402,491 | 9/1983 | Bergsoe | 75/77 |
| 4,571,261 | 2/1986 | Buren | 75/77 |

FOREIGN PATENT DOCUMENTS 132243  1/1985  European Pat. Off. ................ 75/77

Primary Examiner—Melvyn J. Andrews
Attorney, Agent, or Firm—Darby & Darby

[57] ABSTRACT

Disclosed is a method for recovering lead from a scrap which contains lead oxide, lead sulfate and antimony in an oxidized state. The method comprises the steps of:
  (a) continuously charging a refractory lined reaction vessel with the scrap together with a reductant effective for reducing lead oxide;
  (b) melting and agitating the charged material by means of a submerged lance at a temperature of from about 900° C. to about 1150° C. whereby some lead oxide of the scrap is reduced to form molten lead;
  (c) forming a slag layer above the molten lead produced in step (b);
  (d) maintaining an amount of lead oxide in the slag layer;
  (e) removing the molten lead, the removed lead having less than 0.5% by weight of antimony; and
  (f) concentrating as oxide in the slag layer the antimony oxide in the scrap.

7 Claims, 1 Drawing Sheet

4,909,839

SECONDARY LEAD PRODUCTION

RELATED APPLICATION DATA

This application is a continuation-in-part of copending application Ser. No. 837,075 filed Mar. 6, 1986, now abandoned.

FIELD OF THE INVENTION

This invention relates to a method for recovery of lead from a scrap which contains lead and antimony both in oxidized form.

More particularly, this invention is concerned with the efficient recovery of soft lead from the paste component of used automobile lead-acid storage batteries. In addition, the invention may be used in the treatment of lead smelter fume.

BACKGROUND OF THE INVENTION

Scrap lead acid batteries typically contain metal components, for example plates, grids, terminals and metal casing components. These metal components are elemental metals or metal alloys. The battery also has a component known as a battery "paste" or "mud." Battery paste is derived from two chemically distinct sources from within a used battery. The major part of the paste is derived from the lead oxide paste (plattnerite, $PbO_2$) originally coated on the grids during manufacture of the battery, and which takes an active part in the electro-chemical functioning of the battery. The lesser fraction of the paste consists of corrosion products, i.e., oxidation products of the grid alloy. Corrosion of the grids occurs during the life of the battery, but particularly when the battery is in a low state of charge. The grid alloy consists of lead and at least one alloying component from the group antimony, arsenic or tin. Thus, this fraction of the paste from used batteries consists of oxides and sulfates of lead and also contains one or more alloying components such as antimony in an oxidized state.

It has been practice to charge used storage batteries whole or shredded into a blast furnace together with coke and chalk. The lead oxide and sulfate are thereby reduced to metallic lead and a slag containing iron oxide, silica and calcium oxide is produced. In some cases, concentrated scrap including the paste and metallic constituents is treated in electro-furnaces, reverberatory furnaces or slowly-rotating drum furnaces with a reductant, iron and an alkali flux to bind sulphur. Such processes result in an alkali containing slag which is difficult to dispose of without contaminating the environment. The lead produced typically contains undesirable quantities of alloying elements such as antimony and is called "hard" lead.

Another practice was to first shred or comminute the batteries and separate out the rubber or plastic of the battery casing before processing. By adding water to the small particles produced by comminution, the lighter particles float to the surface and are removed. The heavier particles, including lead and lead compounds, are then passed over a rotary vacuum filter to reduce the water content to about 10%. By this means a wet battery paste was made as filter cake and dried. This dried filter cake is subjected to various processes. One process utilizes a long rotary kiln where the pre-dried battery paste is mixed with coke, soda ash and iron chips on a belt feeder before being charged into the oil-fired kiln where the mixture is heated to 1300° C. to accomplish reduction of the PbO and $PbSO_4$ to molten lead. After the PbO is reduced, oxides of arsenic, antimony and other impurities are also reduced to base metals.

Another practice is to separate batteries into fractions and to treat the paste fraction separately from the fraction consisting of metals and alloys.

Treatment of the metals fraction is relatively straightforward, since the starting material is free of sulfates. A suitable method of separating lead from antimony in the alloy is described in U.S. Pat. No. 4,194,904 to Foerster et al.

In the Foerster process the metal components (grids, plates and the like) are first oxidized to yield a molten lead and a slag containing lead oxide and antimony oxide. The slag is then treated to remove the antimony by fuming. Being an oxidative process, this method is not applicable to recovery of lead from lead paste oxides and sulfates.

Treatment of the paste fraction presents particular problems in comparison with treatment of the elemental metals and alloys because of the presence of sulfates in the paste. U.S. Pat. No. 4,571,261 to Buren et al., describes a process in which the batteries are first crushed and separated into constituent fractions. The battery paste fraction is preferably removed by washing and screening from the plates, grids and case material. The non-metallic lead components (primarily lead oxides and sulfates) are then reduced in the absence of a slag or flux at 1050° C. to 1250° C. so as to obtain a molten lead phase in which the alloying elements such as antimony are dissolved. That process suffers from the disadvantage that the resultant lead has about 1.2% to 3.0% of antimony which must subsequently be removed and secondly, it is a relatively energy-intensive and costly process to conduct. This is because the process must be conducted at temperature above 1050° C. and because the battery paste must be dried prior to use.

OBJECT OF THE INVENTION

It is an object of the present invention to provide an simple, inexpensive and quick process for producing substantially pure lead ("soft" lead) from scrap. In accordance with this object it is desirable to use a smaller reactor than has been necessary previously, cutting capital expenditures as well as fuel costs. Fume emissions can be more easily contained.

It is also an object of the present invention to provide a process for producing soft lead from battery scrap, which is fluxless and does not require inventories of lime or soda ash.

It is yet another object to provide a process for producing soft lead from battery scrap, without requiring a refining step.

SUMMARY OF THE INVENTION

Figure 1:
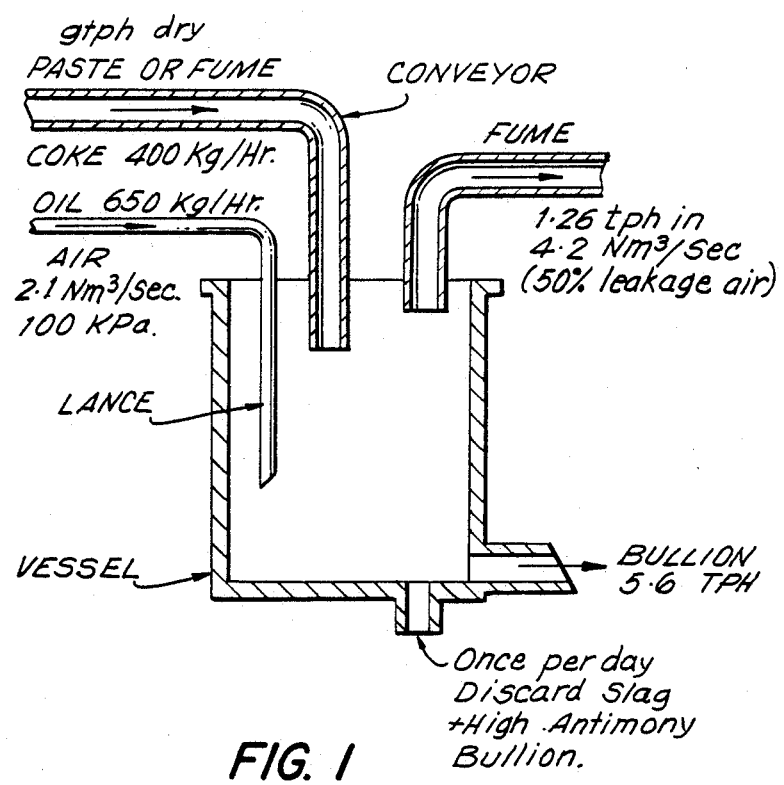
FIG. 1 shows a flowsheet of an embodiment of the present invention.

The present invention is directed to a method for recovering lead from a scrap which contains lead oxide, lead sulfate and antimony in an oxidized state. The method includes the steps of:
(a) continuously charging a refractory lined reaction vessel with the scrap together with a reductant effective for reducing lead oxide;

(b) melting and agitating the charged material by means of a submerged lance at from 900° C. to 1150° C. whereby some of the lead oxide of the scrap is reduced to form molten lead;

(c) forming a slag layer above the molten lead produced in step (b);

(d) maintaining an amount of lead oxide in the slag layer;

(e) removing molten lead, said removed lead having less than 0.5% by weight of antimony; and (f) concentrating as oxide in the slag layer the antimony oxide in the scrap.

DETAILED DESCRIPTION OF THE INVENTION

Preferred embodiments of the present invention result in the production, in a single step, of a sot lead substantially free of antimony. Antimony oxide builds up in the slag layer and the slag may subsequently be treated to reduce the antimony oxide, thereby producing a valuable 14% antimony 86% lead product for use separately from the soft lead for use in downstream antimony-lead alloy production. The present process has the further advantages that a wet battery paste may be used as the feed without prior drying and the process can be conducted at a temperature of from 100° C. to 150° C. lower than that described, for example in previously known methods, for example as described in U.S. Pat. No. 4,571,261. Compared with prior art methods, the present invention is simple, inexpensive and quick. A smaller reactor can be employed which reduces not only capital expenditure but fuel costs as well. Fume emissions are more easily contained and the premixing an drying steps of prior processes are avoided. Preferred embodiments of the invention are fluxless and do not require inventories of lime and soda ash.

The invention achieves its objectives by the vigorous mixing of the battery paste comprising finely divided lead oxides and sulfates with the reducing carbon and the flux or slag by a submerged lance of the type described in U.S. Pat. No. 4,251,271. Production of a PbS containing matte is prevented by maintaining a presence of lead oxide in the slag at all times. Part of the oxide is present in the lead paste, part is formed as the first product of reduction of $PbSO_4$. Pre-drying of the battery paste is not required nor is it necessary to premix the paste with the carbon reductant. The invention will now be described with reference to examples.

Initial testing was performed in a cylindrical refractory lined vessel size to hold 250 Kg of reactants using lead smelter fume as a feed. Lead smelter fume is similar in chemical and mineralogical composition to battery paste, being Pb 72% and S 6%, but without the carbon or impurities such as antimony, arsenic and tin. Using an SIROSMELT (trademark, owned by CSIRO) lance, molten lead was produced continuously from lead fume.

Following this, two metric tons of battery paste was reduced in one continuous run over a period of ten hours. The battery paste had been separated from other battery parts by conventional means. For example, used batteries are crushed, washed, plastic casing components removed by floatation and the paste separated from metal components by screening. The effect of varying coke rates and temperatures was investigated.

During this trial 60 Kg of paste was melted before coke addition started to provide a slag for lance protection. The paste, in the form of wet pellets (110% moisture), was fed continuously, with lump coke, to the furnace. The oil combustion was set at 95% stoichiometry through the whole trial so that the lance contributed to reduction.

Based on the coke rate required to maintain a constant slag level in fume smelting the battery paste reduction was started at 8% coke. This was much too high and 4% coke (4.4% on dry basis) proved to be a preferred level. Because PbO is always present in the slag, arsenic oxide and antimony oxide are not reduced to metal. Therefore, the process produces soft lead (i.e., antimony and arsenic below 0.05%) directly. Battery paste melts to form a slag from which PbO is reduced to lead, while As and Sb oxides concentrate in the slag layer. The slag is fully reduced periodically to produce a high (5-20%) antimony-lead masterbatch for alloying. Existing processes do not selectively reduce lead oxide and produce hard lead which must be further treated to remove antimony.

In addition, the process is fluxless (existing processes add lime and soda ash) and it operates at a low temperature (down to 900° C.) No feed preparation is required.

The reduction proceeded satisfactorily between 900° C. and 1150° C. but a preferred operating range was found to be 950° C.±20° C.

| Test results were as follows: | |
|---|---|
| Weight of wet battery paste treated: | 1,900 kg |
| Weight of lead in battery paste: | 1,212 |
| Product: Lead in Slag | 80.5 |
| Bullion | 930 |
| Fume | 160.3 |
| | 1,170.8 (97%) |
| Oil Consumption: | 75.9 kg/dry ton paste. |

Bullion and slag were tapped from the furnace and assayed. Samples of fume were collected from the ventilation baghouse and also analyzed.

Resultant product recovered averaged according to the following analysis:

| | Pb | S | AS | Sb | Sn | Fe | $SiO_2$ |
|---|---|---|---|---|---|---|---|
| Lead Bullion | — | 0.01 | 0.001 | 0.013 | 0.001 | — | — |
| Slag | 55.7 | 0.1 | 0.100 | 1.64 | 0.06 | 5.4 | 8.5 |
| Fume | 61.4 | 6.4 | 0.424 | 0.182 | 0.01 | — | — |

A mass balance worked out as: bullion 77%, slag 7%, fume 13%, lost 3% on the basis of the lead in the paste as 100%.

Antimony is present in battery paste as antimony oxide since an antimonial-lead alloy is used in battery grids. Smaller quantities of tin and arsenic are also present in scrap lead. The order of reduction of the elements is Pb, Sb then Sn and As. Thus, while there is unreduced lead oxide present, antimony, arsenic and tin oxides will also concentrate in the oxide slag.

The 250 Kg pilot plant was operated at 220 kg/hr dry paste feed. A volume scale-up to a demonstration plant size indicated a feed rate of 9 tph (metric ton per hour) dry paste (10 tph wet) and 15 tph is comfortably handled.

A commercial plant consists of a vessel 5 meters high × 1.8 meters ID (internal diameter), lined with 400 millimeters of chrome magnetite bricks.

The lance consists of 150 millimeter NB mild steel pipe with a 2 meter stainless steel tip (T316 or 310). Swirlers are of the low pressure drop type which can operate on air at 100–120 kPa. Either oil or natural gas may be used as fuel.

The vessel is continuously fed via conveyor belt with battery paste (up to 10% moisture) and coke (−50 mm). Fume recycling is continuous. Alternatively, fume can be retained and fed back instead of paste.

Tapping of lead bullion occurs every 90 minutes leaving unreduced slag in the furnace. Antimony and minerals from coke ash concentrate in this slag, and require a periodic slag reduction run.

Slag reduction is carried out by addition of excess coke and produces a bullion containing antimony (about 20%). The slag from this batch is fully tapped and discarded. Its composition depends on the ash constituents of the coke used and a soda ash flux and/or operation at higher temperature of approximately 1250° C. or higher may be necessary in order to maximize antimony recovery.

A typical flowsheet for such a plant is shown in the accompanying drawing, FIG. 1.

As will be apparent to those skilled in the art from the teaching hereof, the process conditions may be varied to an extent without departing from the inventive concept hereof and such variations are deemed to be within the scope of this disclosure.

What is claimed is:

1. A method for recovering lead from a scrap which contains lead oxide, lead sulfate and antimony in an oxidized state, said method comprising the steps of:
    (a) continuously charging a refractory lined reaction vessel with the scrap together with a reductant effective for reducing lead oxide;
    (b) melting and agitating the charged material at a temperature of from about 900° C. to about 1150° C. by means of a submerged lance through which a reducing mixture comprising fuel and oxygen is injected, and selectively reducing some of the scrap to form molten lead while substantially maintaining said antimony in an oxidized state;
    (c) forming a slag layer above the molten lead produced in step (b);
    (d) maintaining an amount of lead oxide in the slag layer;
    (e) removing the molten lead, said removed lead having less than 0.5% by weight of antimony; and
    (f) concentrating as oxide in the slag layer the antimony oxide in the scrap.

2. The method of claim 1 wherein the scrap is battery paste from lead acid batteries.

3. The method of claim 2 wherein the reductant is coke or coal charged at a rate of less than 8% by weight of paste, on a dry basis.

4. The method of claim 2 conducted without the addition of lime or soda ash.

5. The method of claim 1 wherein a mixture of air or oxygen enriched air and hydrocarbon fuel is passed through the lance, the combustion products of which agitate the bath on emerging from the lance, said mixture having a net reducing effect.

6. The method of claim 5 conducted at a temperature of from between about 910° C. and 990° C.

7. The method of claim 1 further comprising the step of subsequently reducing antimony oxide from the scrap concentrated in the slag layer to produce an antimony master batch containing from 5 to 30% antimony by weight.

* * * * *